United States Patent [19] [11] 3,948,734
Kohl et al. [45] Apr. 6, 1976

[54] DIRECT CONTACT MULTI-STAGE FLASH DESALINATION

[75] Inventors: Arthur L. Kohl, Woodland Hills; Thomas T. Shimazaki, Granada Hills, both of Calif.; William B. Suratt, Fort Lauderdale, Fla.

[73] Assignee: The United Sates of America as represented by the Secretary of the Interior, Washington, D.C.

[22] Filed: July 23, 1974

[21] Appl. No.: 491,012

[52] U.S. Cl.......... 202/173; 159/2 MS; 159/DIG. 8; 202/185 A; 203/11; 203/DIG. 17
[51] Int. Cl.²......................................... B01D 3/02
[58] Field of Search .......... 202/172, 173, 174, 236, 202/233, 234, 235; 261/113, 112; 203/10, 11, DIG. 17; 159/2 MS, 4 B, 4 CC, 4 VM, 4 F, 17 R, 17 C, 17 VS, DIG. 8

[56] References Cited
UNITED STATES PATENTS

| | | |
|---|---|---|
| 3,180,805 | 4/1965 | Chirico .................................. 203/11 |
| 3,206,379 | 9/1965 | Hill ..................................... 202/173 |
| 3,326,779 | 6/1967 | Rodgers ............................... 202/236 |
| 3,351,120 | 11/1967 | Goeldner et al. .................. 159/17 C |
| 3,824,154 | 7/1974 | Takada et al. .................. 159/DIG. 8 |

Primary Examiner—Norman Yudkoff
Assistant Examiner—Frank Sever
Attorney, Agent, or Firm—Gersten Sadowsky; Donald R. Fraser

[57] ABSTRACT

A multi-stage flash, direct contact condensation method and apparatus for purifying brine is disclosed which eliminates costly apparatus previously required while maintaining adequate volume to efficiently produce potable water by use of gravity fed sprays of condensate upon which previously flashed steam is allowed to condense.

4 Claims, 4 Drawing Figures

DIRECT CONTACT MULTI-STAGE FLASH DESALINATION

This invention relates to purification methods and apparatus and particularly to the purification of brines by vaporization and condensation.

Vaporization and condensation techniques require heat exchanges to introduce and recover heat from fluids. One generally used system involves a tubular, indirect contact heat exchanger which can be prohibitively large and costly.

In the purification of materials, including brines, the classic cooling tower concept has been used in which a brine is vaporized into air in a spray chamber and the moist air is transported to a second condensation chamber where pure water is condensed out of the air by contact with cool water on a cool surface. (See, for example, U.S. Pat. No. 3,206,379). Such processes eliminate the tubular heat exchanger but are not successful primarily because of the impracticability of condensing water vapor in the presence of an inert gas carrier which interferes with heat transfer coefficients. Thus, in such a process, condensation chambers have to be huge in size and very high in order to give the desired close temperature approach between vapor and condensing water.

To avoid these problems, it has been proposed to use multistage flash, direct contact condensation processes. These have generally been based on the condensation of flashed vapors directly onto fresh water flowing in trays in evacuated systems, See U.S. Pat. Nos. 3,515,645; 3,395,085 and 3,337,419. Although high heat transfer coefficients are obtained in such systems based on the exposed surface area of the flowing water, heat transfer coefficients based on volume are small compared to those of more conventional tubular surface condenser systems and larger chambers are again required for the condensation step.

In multistage flash plants of either the direct contact or conventional tubular type the cost of the separator-condensor vessel shell represents a major fraction of the plant cost; thus, these plants, which require large chambers, are at an economic disadvantage. For example, in conventional, surface condenser type, multistage flash plants designed to produce 1 million gallons per day of product water with a performance ratio of 10, the evaporator-condenser shell costs about twice as much as the condenser tube bundle and is the largest single capital cost component. The overall size of the evaporator-condenser vessel for such plants is adversely affected by the fact that the size of the flashing chamber is generally larger than necessary, being determined by the dimensions of the tube bundle located directly above it.

High volume coefficients of heat transfer for direct contact vapor condensation and therefore small condensation chamber size requirements are realized by use of high velocity sprays, as employed in some direct contact steam condensers; but conventional spray systems applied to multistage flash processes require a separate water pump for each stage with corresponding process complexity, cost, and operating problems.

According to the instant invention these disadvantages are overcome by a multistage flash, direct contact condensation system which overcomes the economic problems of previously proposed arrangements by minimizing both the condensation and evaporation zone volumes while at the same time greatly reducing the number of condensate pumps required.

Generally speaking the invention provides a relatively cool and pure liquid, which is used to directly condense vapors flashed off an impure liquid in stages in which pure liquid and condensate flows from stage to stage by gravity and contacts vapor in each stage in a crossflow "rain" type spray zone. Typically the direct contact condensation stages are grouped in a module containing 2 to 10 condensation chambers and condensate flows through each module by gravity and then is pumped to the top of the next module. This arrangement keeps both the module height and number of pumps within reasonable limits. For example, in a 24 stage plant with 6 condensation stages per module, only 4 condensate pumps are required, compared with 24 which would be required if gravity flow within modules were not employed. The module height for such a case would typically be on the order of 30 feet.

In order for the condensate to flow to the next higher pressure chamber within each module, a liquid head greater than the sum of the pressure difference between stages and the pressure drop of the liquid flowing through interstage transfer passages is provided by providing flow restrictive perforations in the tray separating adjacent chambers or by providing a "trap" type liquid seal for the condensate flowing between chambers.

In the preferred configuration the functions of brine flashing and steam condensation are separated and the size, shape, and construction material for each of these active chambers can be optimized for its particular function. The condensation chambers in each module are located vertically above the brine flashing chambers and at progressively lower elevations in the direction of condensate flow to permit gravity flow of condensate between chambers. The brine flashing chambers, which may or may not be modular, are preferably at the same elevation although it is also possible to have adjacent chambers somewhat higher or lower. In one arrangement, the flashing chambers may be higher, in the direction of brine flow, when a large pressure differential exists between stages and it is necessary to provide additional driving force for brine flow. In operation brine flows from one flashing chamber to the next lower pressure flashing chamber through flow restrictive orifices and water vapor flashes off as a result of the pressure reduction. The water vapor flows upward through a vapor duct to the corresponding condensation chamber where it flows through in crossflow relationship to a "rain" of cooler falling water streams or droplets and is thereby condensed, raising the temperature of the total condensate stream.

In this process, the flashing water is at its boiling point and substantially pure steam is evolved upon exposure to a chamber of reduced pressure and is subsequently condensed. To accomplish this, the flash chambers are at progressively lower pressures unlike other evaporators in which they are all at atmospheric pressure and sufficient height differential is provided in the condensation chamber to permit the fresh water to flow into a chamber of higher pressure. The process uses a plurality of stages to achieve high efficiency with the stages grouped in modules of 2 to 10 stages, although more could be used, 10 is a practical preference because of the height requirement per stage.

The invention will be better understood by reference to the figures provided. In the figures, like numerals represent like elements and FIG. 1 is a diagrammatic representation of a purification plant incorporating the apparatus of this invention.

Figure 1:
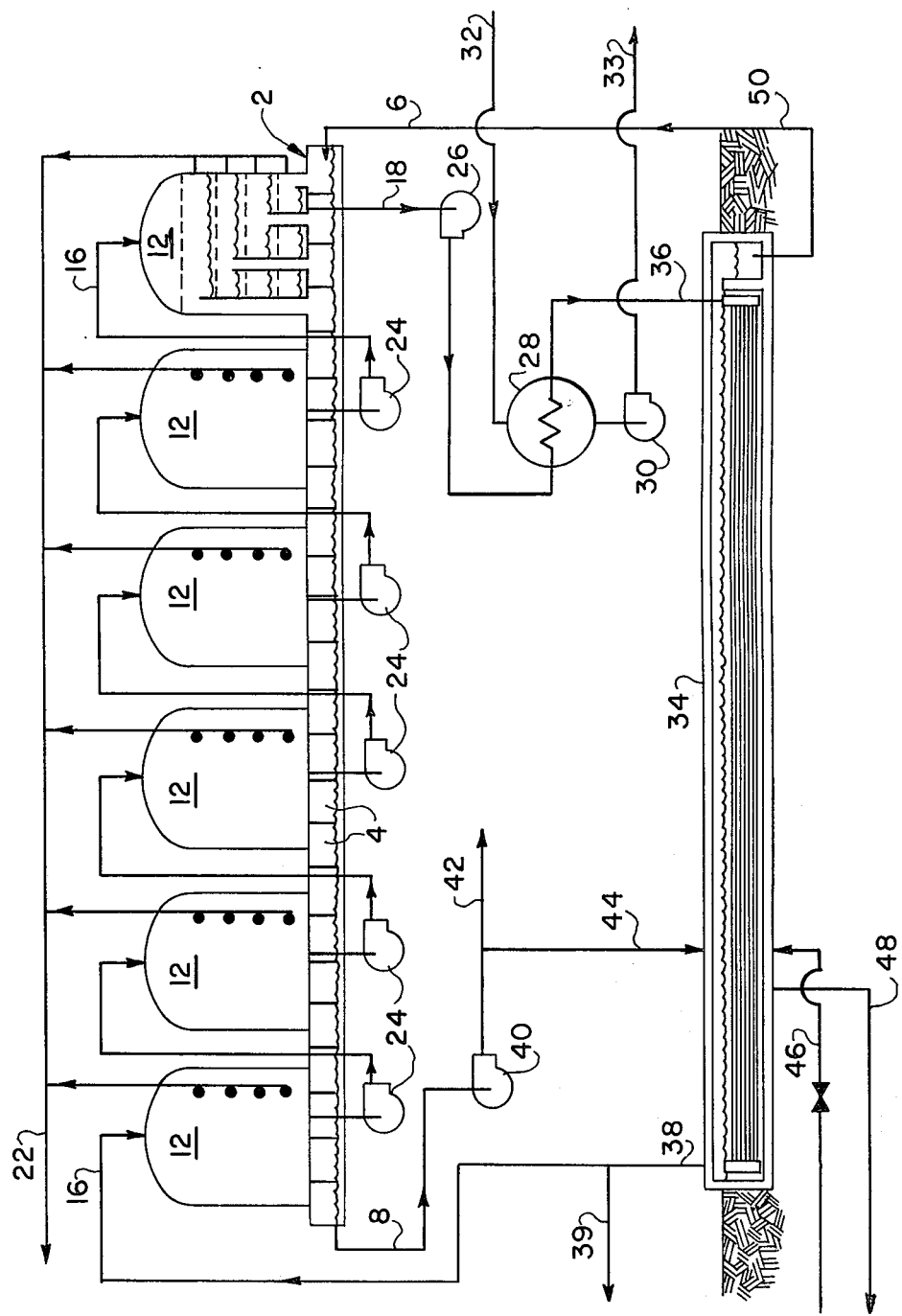

Referring more particularly to FIG. 1, 2 represents a series of flash chambers which is shown in the figure as being horizontally aligned although as earlier mentioned, it could be inclined above or below the horizontal along the direction of flow. Individual flash chambers are shown generally within this figure and are designated 4. Viewing the apparatus in its overall context, a brine inlet line 6 is seen to provide heated brine or other impure liquid which is fed to the entrance of the first flash chamber of the first stage in the series 2. Each flash chamber has an outlet 8 and the overall system has an outlet line 8 from which concentrated brine is withdrawn. Superimposed upon the series of flash chambers are a series of condensation chamber modules designated 12 which, as shown in the right hand portion of FIG. 1, contains a number of superimposed condensation chambers—one for each flash chamber —so that a set of flash and condensation chambers is a stage. The condensation chambers are provided with a condensate inlet line 16 and a condensate outlet line 18. The system is evacuated and non-condensables are vented to the vacuum through a series of lines 22 and an evacuation apparatus (not shown). The condensate travels by gravity within a module 12 and it is one of the advantages of the instant invention that a pump is not required to feed condensate between stages. A pump is required only between modules 12 and as shown in the figure pumps 24 are provided for this purposes. The pump 26 serves a similar function to pumps 24 but it withdraws condensate and feeds it to a heat exchanger 28 where it is initially heated by, for example, steam fed through line 22 which condenses and is withdrawn through pump 30 and line 33. After passing this heat exchanger, the hot condensate enters another heat exchanger 34 where it passes through the tubes via line 36 leading to the header as more fully described subsequently and is withdrawn after having been cooled through line 38 where a product portion can be withdrawn via line 39 and a recycle portion comprising cool condensate is fed via line 36, as previously described, into the system. Viewing the brine flow it is seen that the brine in concentrated state exits via line 8 and is pumped through line 40 through the heat exchanger 34. Prior to this, a portion 42 is withdrawn via a blowdown line and the major portion is fed as recycle through line 44 where it passes on the tube side of the heat exchanger and is heated by the hot condensate passing within the tubes. A makeup brine line 46 is provided from a source (not shown) such as an ocean or reservoir. A portion of the brine which enters the heat exchanger via line 44 may be withdrawn via line 48 and returned to the source but the major portion is recycled via line 50 where it becomes the feed 6 for the system.

Figure 2:
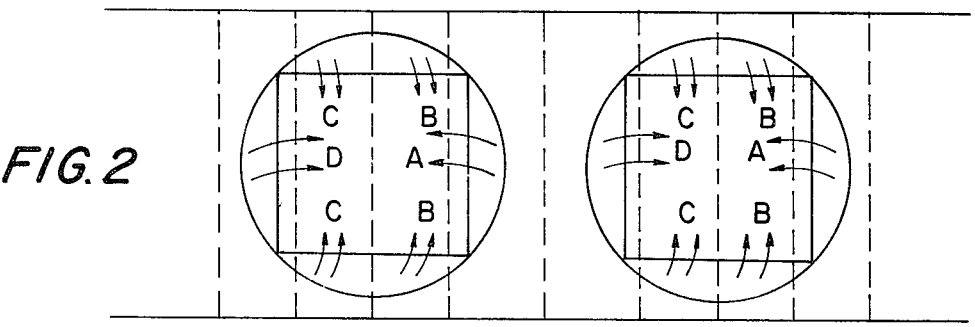
FIG. 2 is a top view of a module containing several flash chambers and several condensation chambers and showing the direction of vapor flow from each flash chamber.
Figure 3:
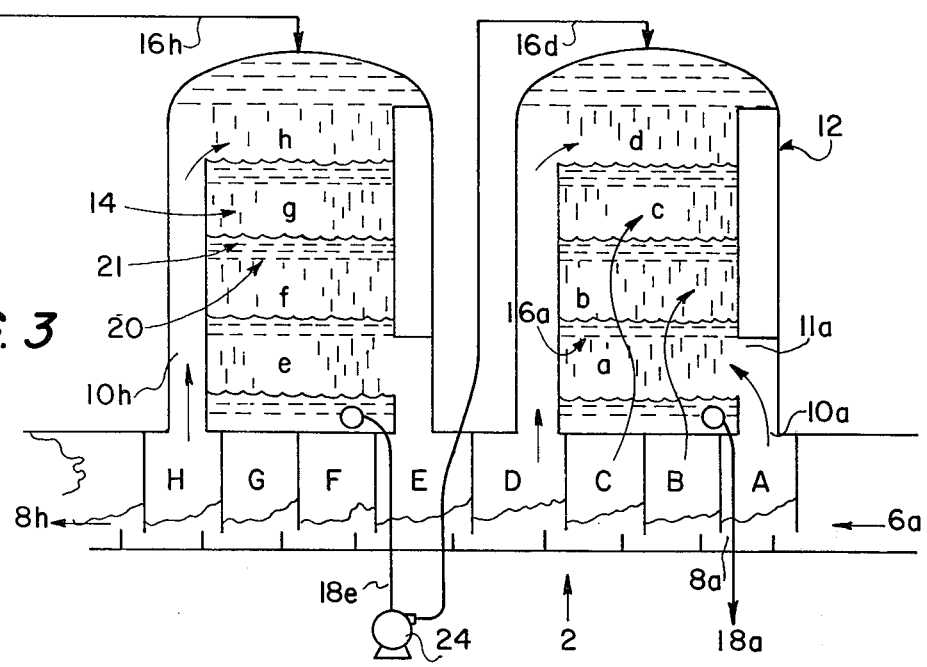
FIG. 3 is a diagrammatic representation of a preferred construction of one of the modules containing the several flash chambers and serveral condensation chambers and FIG. 4 shows in greater detail one of the condensation chambers provided according to this invention.

Referring now to FIG. 2, a top view of one of the modules 12 is illustrated and in FIG. 3 the operation and sectional view are shown. Referring first to FIG. 3, the individual flash chambers have been designated A, B, C, etc. and the corresponding direct condensation chambers are designated $a,b,c$, etc. While it is possible to have from 2 to 10 or even more stages-sets of chambers-per module the illustrated and preferred embodiment utilizes 4 such sets. Each stage has a flash chamber which has a brine inlet, a brine outlet, and a vapor outlet. The brine inlet is designated 6 and the inlet for the stage is designated $6a$. Likewise, the exit for this stage is designated $8a$ and the vapor outlet for this stage is designated $10a$. Each stage also has a direct condensation chamber which has a condensate inlet, a condensate outlet, and a vapor inlet. For stage $a$, the vapor inlet is designated $11a$, the condensate inlet is designated $16a$ and the condensate outlet is designated $18a$. These individual chambers are more fully described with reference to the subsequent figures. As shown in FIG. 3, the condensate passes through each individual direct condensation chamber in the form of rain 14 which is produced by a head of water 21 passing through a perforated plate 20 into the next stage. The condensate will not pass into the next stage which is at a higher pressure until sufficient head is built-up to overcome the pressure differential between stages plus any frictional and other losses.

Referring back to FIG. 2, the vapor flow within the illustrated circular module embodiment is shown diagrammatically. The vapor from chamber A passes up the right side and into chamber $a$ whereas the vapor from B passes up a portion of the adjacent sides into chamber $b$ and a parallel passage is provided for the vapor from chamber C while the vapor from chamber D passes up the side opposite from A. This preferred form is not essential, but it is essential to maintain separate passages for the stages which are hermetically sealed from the other individual stage flash chambers.

Figure 4:
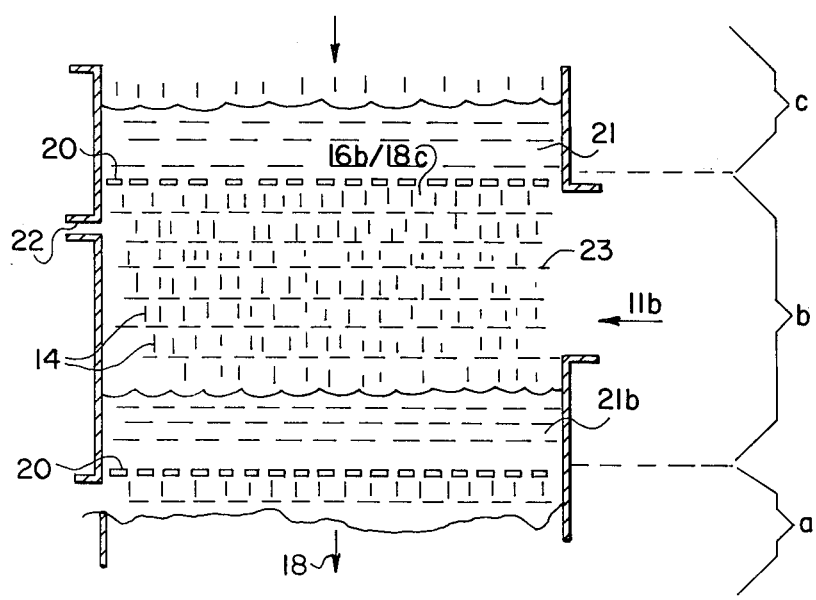

Referring now to FIG. 4, a preferred form of condensation chamber is illustrated wherein the entire portion of one chamber $b$ is shown and portions of adjacent chambers $c$ and $a$ are also shown. The area designated $16b/18c$ will be seen to comprise the condensate exit from chamber $c$ as well as the condensate entrance to chamber $b$. This portion actually corresponds to the perforations in perforated plate 20. The flow at this point will occur only when the liquid head of condensate 21 in chamber $c$ is sufficient to overcome the higher pressure and frictional forces required to enter the chamber $b$. In the chamber $b$, the vapors are introduced via $11b$ which is directly in communication with vapor outlet $10b$ of flash chamber B. As shown in the chamber $b$, rain drops 14 are produced and it is possible and often desirable to intersperse additional screens 23 in order to increase the particles of condensate available for contact with the vapors of steam which are entering. As the relatively hot steam contacts the surface of the relatively cool condensate particles in the chamber $b$, it is condensed and all of the condensate is collected at $21b$ which, upon accumulation, exits to chamber $a$. A non-condensable gas vent 22 is shown located intermediate the condensate entrance and exit in order to maintain the evacuated condition and improve the head transfer by ensuring elimination of gases which could complicate the heat transfer mechanism. This vent may be located at different positions as subsequently described. It will be seen that the vapors are caused to flow in a direction perpendicular to the "rain" in order to increase contact according to the invention.

The above described structures are preferred but not essential inasmuch as differences in orientation and location as well as number of units per module as possible. Specifically, the vertical alignment of the flash chambers and the condensation chambers is not essential. By tilting the module 12 at an angle to the horizontal but still maintaining direct vapor communication with the respective flash chambers the same type of system could be realized. This would increase the floor space required but is given to illustrate the advantages and adaptability of design. In any of the systems, it is desirable to insert mist eliminators in the passage which the vapor will take from the flash chamber to the condensation chamber and also to insert turning vanes or baffles to direct vapor flow perpendicular to the rain of condensate. Another variation is possible in the condensation chamber. Instead of having the liquid head accumulate directly on the perforated plate as shown in FIG. 4, it is possible to insert a trap type accumulator. Thus, instead of having only a perforated plate 20 as shown in FIG. 4, the perforated plate could be combined with a superimposed solid plate which is inclined so as to direct condensate flow into a narrow channel where, upon accumulating sufficient head, it flows into and across the perforated plate. In such an arrangement, the noncondensables vent could be located in the vertical space provided between the solid plate (not shown) and the perforated plate, as well as or in place of the vent shown in FIG. 4.

The details of construction of heat exchanger 34 which is shown in the overall system of FIG. 1 do not form a part of the instant invention, however, the system described hereinafter preferably utilizes a plastic film heat exchanger. This system basicaly consists of a rectangular excavated concrete lined pool containing a large number of parallel horizontal plastic tubes. The tubes are potted at each end of the exchanger to form the tube sheet portion of the water box header. Each header serves a relatively small fraction of the total number of tubes and the tubes are maintained under tension. The entire pool is roofed with removable sections for access to headers, tubes, etc. Polyethylene tubes of ⅜ inch diameter and wall thickness 0.006 inch are recommended. The pumps and the other materials of construction are likewise not a part of the invention and suitable materials are readily available to the art. Stainless steel materials are preferred for the perforated rain producing trays as well as the screens and other elements which may be in contact with the vapor. Other protective materials are available to the art and are used for brine systems which may be corrosive.

To further illustrate the advantages of the invention the following preferred example is given.

Sea water at 65°F is fed to the plant from an intake system 46 located on an ocean beach. It is chlorinated as required to control biological growth and screened to remove debris before being pumped to the plant. The sea water is fed into the cold end of the heat exchanger channel 34 where it flows by gravity countercurrent to the condensate which is inside the plastic tubes. The cold end of heat exchanger 34 serves as a heat reject section. After flowing through the heat reject section, a major portion of the sea water is removed via line 48 at about 90°F, and the remaining sea water flows into the low temperature end of the heat regenerator section of heat exchanger 34, serving as sea water makeup for the process. Recycle brine is also fed via line 44 at this point. Any additive required to control scale deposition on the brine side of the plastic tubes (outside surface) is added to the recycle brine prior to its entry into the heat exchanger, but after removal of a blowdown steam via line 42. The use of sodium polymethacrylate (W. R. Grace & Co. Derex 40) at a concentration of 2 ppm based on a sea water feed rate of 1,742,000 pounds per hour is preferred.

The mixture of recycle brine and fresh sea water makeup flows the entire length of the regenerator section countercurrent to hot condensate inside the tubes, and leaves the hot end via line 50 at 200°F. From this point it flows directly into the first stage of the multistage flash, direct contact condensation system a line 6. The brine flashes 4.6°F in each of 24 flash chambers, which are at progressively lower pressures, and leaves the last stage at 89.6°F. Dissolved gases (primarily air) are removed almost entirely via lines 22 in the first four flash chambers which also serve as deaerators. Since no acid is added during normal operation, the brine pH is on the alkaline side (pH 8.5 – 9.2) and very little $CO_2$ is evolved. The high pH of the circulating brine is also a favorable factor from the standpoint of corrosion.

Six direct contact condensation modules 12 are located above the train of flash chambers 2; each module 12 contains four condensation chambers. Cooled condensate at 80.4°F is fed to the first condensation chamber (corresponding to the last flash chamber) which is the highest chamber of its module. The condensate flows downward through a perforated plate to form a rain of water jets in the contact condensation zone. A series of horizontal perforated trays (or screens) are placed in the contact zone to serve to mix and reform the droplets as they fall. Water vapor from the last flash chamber is conveyed upward through a duct containing a mist eliminator, and then flows horizontally through the corresponding condensation chamber. Noncondensible gases are removed from the condensation chamber via line 22 at the side opposite the steam entrance and are passed through a baffle arrangement to minimize steam loss prior to venting to the vacuum system. The condensate, which is heated by steam condensed in the chamber, collects at the bottom (outlet) of the last condensation chamber and builds up to a level sufficient to overcome both the pressure difference between the adjacent stages and the pressure loss through the perforated plate which forms droplets for the adjacent stage.

The condensate passes through all stages in series becoming warmer and increasing in volume as it condenses steam in each stage. It is drawn from the last modular condensation chamber by a centrifugal pump which lifts it to the top of the next module where it passes through other chambers in a similar manner. This is repeated until the condensate stream has passed through all six modules and reaches the storage zone at the bottom of the last condensation chamber corresponding to the first flash chamber at a temperature of 190.8°F.

Hot condensate from the last chamber was withdrawn from the module by a pump 18 and forced through the metal tubed heat input condenser 28, which was supplied with low pressure (14 psia) steam at 209.0°F. The condensate temperature was raised here from 190.8° to 202.0°F. The heated condensate then flows to the heat exchanger 34 via line 36 where the stream is split so that it enters ten individual plastic tube headers in parallel. The condensate flows from per hour; condensate is fed at 80.4°F and at a rate of 7,637 million pounds per hour.

TABLE

| Stage | Brine Exit T | Condensate Exit T | Brine Flow Entering | Condensate Exiting | Condensing Steam Pressure | Δ P To Lower Stage | Brine Salt Concentration | Mass Product |
|---|---|---|---|---|---|---|---|---|
| A/a | 195.4 | 190.8 | 8,979 | 8,504 | 9.914 | 26.6 | 6.06 | 40 |
| B/b | 190.8 | 186.2 | 8,940 | 8,465 | 8.985 | 24.4 | 6.09 | 39 |
| C/c | 186.2 | 181.6 | 8,901 | 8,426 | 8.131 | 22.4 | 6.11 | 39 |
| D/d | 181.6 | 177.0 | 8,862 | 8,387 | 7.345 | 20.5 | 6.13 | 39 |
| E/e | 177.0 | 172.4 | 8,824 | 8,348 | 6.625 | 18.8 | 6.16 | 38 |
| F/f | 172.4 | 167.8 | 8,786 | 8,310 | 5.945 | 17.1 | 6.19 | 38 |
| G/g | 167.8 | 163.2 | 8,748 | 8,272 | 5.361 | 15.6 | 6.22 | 38 |
| H/h | 163.2 | 158.6 | 8,711 | 8,234 | 4.810 | 14.3 | 6.25 | 37 |
| I/i | 158.6 | 154.0 | 8,674 | 8,197 | 4.306 | 12.9 | 6.27 | 37 |
| J/j | 154.0 | 149.4 | 8,637 | 8,160 | 3.849 | 11.7 | 6.29 | 37 |
| K/k | 149.4 | 144.8 | 8,601 | 8,123 | 3.433 | 10.6 | 6.32 | 36 |
| L/l | 144.8 | 140.2 | 8,565 | 8,087 | 3.037 | 9.6 | 6.35 | 36 |
| M/m | 140.2 | 135.6 | 8,529 | 8,051 | 2.717 | 8.7 | 6.38 | 36 |
| N/n | 135.6 | 131.0 | 8,493 | 8,015 | 2.407 | 7.7 | 6.40 | 36 |
| O/o | 131.0 | 126.4 | 8,458 | 7,979 | 2.131 | 7.0 | 6.42 | 35 |
| P/p | 126.4 | 121.8 | 8,423 | 7,944 | 1.881 | 6.2 | 6.45 | 35 |
| Q/q | 121.8 | 117.2 | 8,388 | 7,909 | 1.659 | 5.7 | 6.48 | 35 |
| R/r | 117.2 | 112.6 | 8,353 | 7,874 | 1.456 | 5.0 | 6.51 | 35 |
| S/s | 112.6 | 108.0 | 8,319 | 7,839 | 1.275 | 4.4 | 6.54 | 34 |
| T/t | 108.0 | 103.4 | 8,285 | 7,805 | 1.112 | 4.1 | 6.57 | 34 |
| U/u | 103.4 | 98.8 | 8,251 | 7,771 | 0.967 | 3.6 | 6.60 | 34 |
| V/v | 98.8 | 94.2 | 8,217 | 7,737 | 0.838 | 3.2 | 6.62 | 34 |
| W/w | 94.2 | 89.6 | 8,184 | 7,703 | 0.723 | 2.8 | 6.64 | 33 |
| X/x | 89.6 | 83.0 | 8,151 | 7,670 | 0.623 | — | 6.67 | 33 | each header into numerous small diameter plastic tubes submerged in the brine which is being heated. The heat exchanger 34 was divided into two units; the condensate leaves the first unit, through headers on each of the 10 tube bundles, makes a 180° turn in external pipe section, then enters a corresponding tube bundle in the second unit. When the condensate finally leaves the heat exchanger 34 by way of a header system at the cold end of the heat reject section, it has been cooled to a temperature of 80.4°F. A portion of this water is drawn off as product at line 39 and the remainder is recycled via line 16 to the top of the last direct contact condensation module.

A summary of operating characteristics in the system described is given below. The table below illustrates conditions achieved in a 24 stage, six module unit using flash chambers of 5 to 6 feet in length, and 19 to 25 feet in width; and using condensation chambers of 10 to 13 feet in length, 10 to 13 feet in width, and about 2 to 5 feet in height. The height given for the condensation chamber is the combined height of the area of spray contact which ranges from 2 to 4.5 feet in height and the height of the condensate level required which ranges from about 0.5 to about 2.5 feet. The variations in dimensions result from variations in the respective stages and generally speaking the flash chambers and condensation chambers increase in size slightly along the respective flow paths of brine and steam.

In the table, conditions are given according to the point of measurement which as previously described represents two points of a stage in some instances. For example, referring to FIG. 3, it is seen that the temperature of the brine leaving the first stage (8a) will be the same as the temperature of the brine entering the second stage (6b) and the temperature of condensate exiting the second stage is equal to the condensate temperature entering the first stage a. Temperatures are reported in the table in degrees F. and flow rates in million pounds per hour. The pressures are given for a stage in psia of condensing steam but the pressure drop between stages is given in inches of water. In the system described, the brine is fed at 200°F, 6.03% by weight salt concentration and at a rate of 9,019 million pounds For further operational and economic details reference is made to the disclosure of National Technical Information Service Publication No. PB-220643 of the Office of Saline Water, U.S. Department of Commerce, and the disclosure thereof is herein expressly incorporated by reference.

Having described the invention by way of preferred embodiment and in the terms required by the patent statute, we claim:

1. An apparatus for distillation of brines in a series of condensation chamber modules superimposed over a series of flash chambers, through which a flow of heated brine is maintained and wherein baffle means hermetically sealing each adjacent flash chamber downstream of brine flow at a pressure lower than that pressure which exists within the flash chamber preceding said adjacent flash chamber enabling said brine to flow between said flash chambers, each said module comprising a condensate inlet means and a condensate outlet means, and at least first and second contiguous stages;

said first stage communicating with a first of said flash chambers having a brine inlet, a brine outlet, and a vapor outlet; said first stage comprising a direct condensation chamber having a vapor inlet, a condensate inlet, and a condensate outlet, said condensate inlet including means for distributing condensate in the form of a rain of drops thereof from a source thereof in said second stage, said drops falling by gravity through substantially the entire volume of said first stage; and wherein vapor from said flash chamber flows through said vapor outlet said first flash chamber and into said vapor inlet which is positioned to direct said vapor into and substantially perpendicular to the rain produced by said condensate inlet distributing means;

said second stage communicating with a second of said flash chambers located down the brine stream from said first flash chamber, and having a second brine inlet, a second brine outlet, and a second vapor outlet; and said second stage comprising a second direct condensation chamber having a second vapor inlet, a second condensate inlet, and a second condensate outlet having structure in common with said first stage condensate inlet and constituting said liquid distributing means, said second condensate inlet including further means for distributing condensate in the form of a rain of drops of condensate having as a source of condensate from at least said module condensate inlet means, said drops falling by gravity through substantially the entire volume of said second stage; and wherein vapor from said second flash chamber flows through said second vapor outlet of said second flash chamber and into said second vapor inlet which is positioned to direct said vapor into and substantially perpendicular to the rain produced by said second condensate inlet distributing means, said second stage further comprising means to evacuate non-condensable gas therefrom and to maintain said second stage at a pressure lower than said first stage, and said source of condensate in said second stage is maintained at a sufficient head of liquid to overcome the pressure differential between said first and second stages and thereby effect flow of condensate from said second stage to said first stage while hermetically sealing said first stage condensation chamber from said second stage condensation chamber.

2. Apparatus according to claim 1 wherein each condensation chamber module contains a series of said direct condensation chambers, said second stage direct condensation chamber being at a position vertically above said first direct condensation chamber, and each succeeding direct condensation chamber of said series thereof being positioned vertically above the preceding direct condensation chamber, and wherein all of said direct condensation chambers of said apparatus are vertically above all the flash chambers.

3. Apparatus according to claim 2 wherein a second of said series of condensation chamber modules is provided down the brine stream from a first of said series of condensation chamber modules and wherein said condensate outlet means of said second modular chamber is provided with pump means to deliver consensate to said condensate inlet means of said first modular chamber, and wherein said maintenance of a sufficient head of liquid to overcome pressure differential between contiguous stages and to hermetically seal such stages from one another is on a plate having flow restrictive perforations adapted to produce a spray of condensate into said one of such stages at a higher pressure than the other.

4. Apparatus according to claim 1 further including means to heat said brine flowing in said flash chambers, comprising a heat exchanger means also serving as means to cool condensate fed to a last stage direct condensation chamber of said apparatus by way of said condensate inlet means of said condensation module thereof, and said means hermetically sealing each said flash chambers from another is a liquid seal and a flow restrictive orifice therebetween.

* * * * *